United States Patent
Tumayan et al.

(10) Patent No.: US 9,024,752 B2
(45) Date of Patent: May 5, 2015

(54) TRAVELER HURRY STATUS MONITOR

(75) Inventors: Claudie Tumayan, Valbonne (FR); Louis Parisot, Annecy (FR)

(73) Assignee: Amadeus S.A.S., Biot (FR)

( * ) Notice: Subject to any disclaimer, the term of this patent is extended or adjusted under 35 U.S.C. 154(b) by 423 days.

(21) Appl. No.: 13/440,413

(22) Filed: Apr. 5, 2012

(65) Prior Publication Data
US 2013/0265154 A1 Oct. 10, 2013

(51) Int. Cl.
| | | |
|---|---|---|
| G08B 1/08 | (2006.01) | |
| H04W 4/04 | (2009.01) | |
| G08G 1/123 | (2006.01) | |
| H04M 1/725 | (2006.01) | |
| G06Q 10/10 | (2012.01) | |
| G08G 1/00 | (2006.01) | |
| G01C 21/34 | (2006.01) | |
| G06Q 10/08 | (2012.01) | |
| B61B 15/00 | (2006.01) | |

(52) U.S. Cl.
CPC ............... *H04W 4/046* (2013.01); *G08G 1/202* (2013.01); *G01C 21/3423* (2013.01); *G06Q 10/08* (2013.01); *B61B 15/00* (2013.01); *G08G 1/123* (2013.01); *H04M 1/72522* (2013.01); *G06Q 10/109* (2013.01)

(58) Field of Classification Search
CPC ...... B61B 15/00; G06Q 10/08; G06Q 10/109; G08G 1/202; G01C 21/3423
USPC .................................................... 340/539.13
See application file for complete search history.

(56) References Cited

U.S. PATENT DOCUMENTS

| | | | | |
|---|---|---|---|---|
| 4,964,767 A | * | 10/1990 | Leitz ................................ 410/65 |
| 6,240,362 B1 | * | 5/2001 | Gaspard, II .................... 701/410 |
| 6,477,462 B1 | * | 11/2002 | Rychlak ......................... 701/410 |
| 8,188,859 B1 | * | 5/2012 | Emigh ....................... 340/539.13 |
| 8,606,801 B2 | * | 12/2013 | Goldstein et al. .............. 707/758 |
| 2004/0088392 A1 | * | 5/2004 | Barrett et al. .................. 709/223 |
| 2008/0139245 A1 | * | 6/2008 | Huh et al. ................... 455/556.2 |
| 2012/0131212 A1 | * | 5/2012 | Tang et al. ..................... 709/228 |
| 2013/0046788 A1 | * | 2/2013 | Goldstein et al. ............. 707/780 |
| 2013/0096813 A1 | * | 4/2013 | Geffner et al. ................. 701/117 |
| 2013/0265154 A1 | * | 10/2013 | Tumayan et al. ......... 340/539.13 |

FOREIGN PATENT DOCUMENTS

| | | |
|---|---|---|
| GB | 2412281 A | 9/2005 |
| WO | 2005013169 A1 | 2/2005 |

OTHER PUBLICATIONS

European Patent Office, International Search Report issued in International Application No. PCT/EP2013/001021 dated Jul. 10, 2013.

* cited by examiner

*Primary Examiner* — Jennifer Mehmood
*Assistant Examiner* — Rufus Point
(74) *Attorney, Agent, or Firm* — Wood, Herron & Evans, LLP

(57) ABSTRACT

A method, apparatus, and program product communicate a hurry status indication to a traveler to enable that traveler to determine when he or she should commence a trip, and in particular, a transfer segment of the trip from a first location where the traveler is currently located to a second location where a passenger vehicle, e.g., an airplane or train, is scheduled to depart to ensure that the traveler will be able to board and travel on the passenger vehicle.

38 Claims, 9 Drawing Sheets

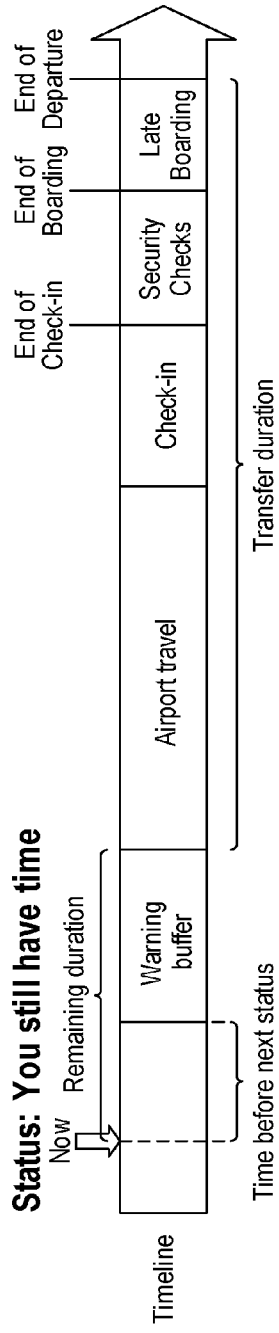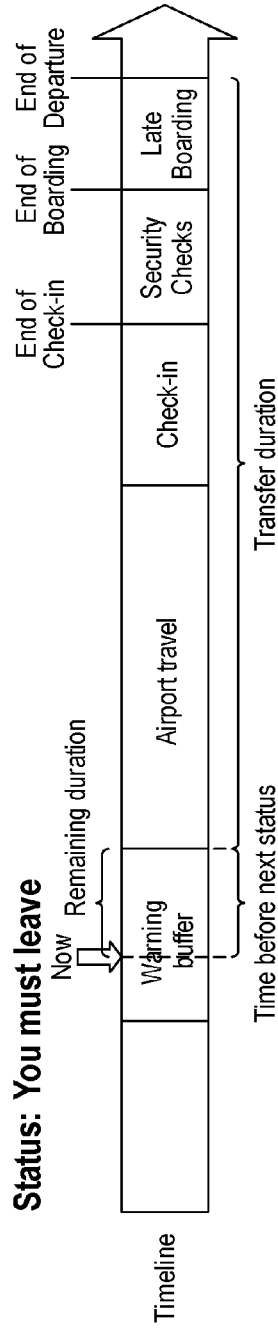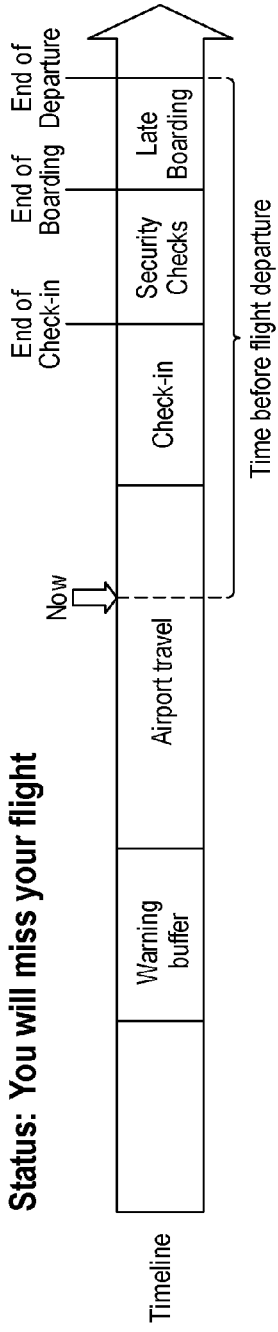
FIG. 7A
FIG. 7B
FIG. 7C

TRAVELER HURRY STATUS MONITOR

FIELD OF THE INVENTION

The invention is generally related to computers and computer software, and in particular, to status monitoring systems for travelers.

BACKGROUND OF THE INVENTION

Computer technology is increasingly used by travelers to make traveling less difficult and more efficient. Automated booking systems, for example, enable travelers to view prices and schedules for passenger vehicles such as airplanes, buses, trains, subways, ferries, cruise ships, etc., as well as purchase tickets for such vehicles when a suitable match is found. Flight and public transportation status systems are available to track delays in scheduled flights, buses, subways and passenger trains, often enabling travelers to view in real-time where a passenger vehicle is current located and when it will arrive at its intended destination. In addition, for road travel by car, traffic information is often available in real time to enable travelers to identify delays on certain routes, and in many cases, to change their planned routes in order to avoid delays.

Concurrent with the improvements in computer technology is an increasing reliance on mobile devices such as smart phones by travelers. Many travel-related tools that were once limited to access via computers, e.g., via web sites, are now optimized for access via a mobile device, whether by mobile device optimized web sites or web-based applications, or via dedicated mobile applications.

Despite these improvements in travel-related computer technology, challenges still remain for many travelers. In particular, travel-related information is often available from a multitude of different sources, and often a traveler is required to know where to locate desired information from multiple different information providers in order to answer relatively basic travel-related questions.

For example, many travelers are often confronted with a crucial question: when should I leave to be on time at the airport or the rail station being sure I will not miss my flight or my train. Particularly when a traveler is located at a different location from the airport or rail station, the answer to this question is deceptively difficult to answer. A business traveler, for example, may be visiting a client or customer at that client or customer's facility, and scheduled for a flight later that afternoon or evening. The traveler may be tied up in meetings all day, and have limited ability to check various travel information sources to determine when he or she absolutely needs to leave for the airport. As a result, travelers in such situations are often subjected to significant stress trying to decide when they need to leave for the airport, or if necessary, reschedule their flight.

Much of the difficulty associated with answering the aforementioned question is caused by all of the variables that can make it difficult to accurately calculate when a traveler needs to leave in order to make his or her ticketed flight or train. For example, the transfer from the traveler's current location to the airport or train station may be affected by delays associated with the mode(s) of transportation used for the transfer. If traveling by car or taxi, for example, the amount of time required to reach the airport or train station will vary based upon distance, route traveled, and the presence of any traffic along the selected route. If traveling by public transportation such as bus, subway or rail, the amount of time may further be impacted by schedules and delays in service.

Moreover, even after the traveler has reached an airport or train station, additional time will typically need to be allocated to ensure that the traveler has sufficient time to board and depart with his or her scheduled flight or train. Security checkpoints, for example, may introduce delays, and some airports or train stations may be large and spread out, and require additional time for activities such as returning a rental car, walking to a ticketing station, walking to the security checkpoint, and/or walking from the security checkpoint to a departure gate. Furthermore, different airports and train stations, as well as different carriers, may implement different rules that impact when a traveler needs to reach the gate in order to be allowed to board the ticketed passenger vehicle. For example, in order to ensure that a passenger vehicle is able to leave on time, a rule may be implemented that prevents boarding within 10 minutes of a scheduled departure.

In addition, a scheduled passenger vehicle or train may itself be subject to delays, e.g., due to a delay in the arrival of an airplane at the airport on a previous flight due to inclement weather.

Another important question often posed to travelers in similar situations is: if I want to stay longer, is there a later flight or train? A business traveler, for example, may be requested by his or her client or customer to extend his or her stay an hour or two beyond when the traveler was planning on leaving for the airport. In that case, the traveler is often unaware of later flights, and even if later flights are available, whether any change fees are required in order to change his or her reservation.

Conventional approaches to provide travelers with travel-related information have been proposed, but have not been satisfactory for solving the aforementioned dilemmas. For example, some train status monitoring systems map times to distances to enable a passenger scheduled to depart on a train to be automatically rescheduled on a later train if a time corresponding to the distance from the traveler to the train's departure station is greater than a time until the traveler is scheduled to depart on the train. In addition, such systems may send an alert to a traveler when the traveler is found to be not moving to encourage the traveler to leave as soon as possible in order to make their scheduled departure. In addition, some travel information systems may provide real-time travel management for travelers traveling by multiple modes of transportation, e.g., to automatically reroute a traveler based upon real-time travel information, or in the least warn a traveler of an unexpected event that has arisen since the traveler commenced their travels.

Therefore, a substantial need continues to exist in the art for an improved manner of providing travelers with status information suitable for enabling them to determine when they need to commence a trip, and in particular, when they need to commence a transfer segment of a trip in order to board and depart on a passenger vehicle disposed at a geographically distant location from their current location and/or to determine whether rescheduling is available and appropriate.

SUMMARY OF THE INVENTION

The invention addresses these and other problems associated with the prior art by providing a method, apparatus, and program product that communicate a hurry status indication to a traveler to enable that traveler to determine when he or she should commence a trip, and in particular, a transfer segment of a trip from a first location where the traveler is currently located to a second location where a passenger vehicle, e.g., an airplane or train, is scheduled to depart to ensure that the traveler will be able to board and travel on the passenger vehicle.

In some embodiments consistent with the invention, for example, various travel-related information, such as departure times, airport and/or airline rules, real-time traffic, etc., may be collected and utilized to determine an estimated transfer duration required for the traveler to travel from the first location to the second location and board and depart on the passenger vehicle. Based upon this estimated duration, a hurry status indication, including, for example, a duration remaining before the traveler needs to commence a trip, and in particular, a transfer segment of such a trip, and/or a indicator corresponding to a degree of urgency (e.g., conveyed via different colors), may be communicated to the traveler, e.g., via a display of the hurry status indication on the traveler's mobile device. By doing so, the traveler is typically better informed as to how much time the traveler has before having to commence the trip, often reducing the stress that otherwise is induced when the traveler faces an uncertain trip in an unknown city or country.

Therefore, consistent with one aspect of the invention, a status for a traveler disposed at a first location and desiring to travel on a passenger vehicle that is scheduled to depart from a second location at a scheduled time is monitored. Prior to the traveler commencing a transfer segment of a trip from the first location to the second location for departure on the passenger vehicle, a determination is made of an estimated remaining duration before the traveler should commence the transfer segment of the trip from the first location to the second location to ensure that the traveler will be able to board and travel on the passenger vehicle. The estimated remaining duration is based at least in part upon an estimated transfer duration required for the traveler to travel from the first location to the second location and board and depart on the passenger vehicle, wherein the estimated transfer duration is based at least in part on real-time delay information associated with at least one mode of transportation to be used by the traveler to travel between the first location and the second location. A hurry status indication is then communicated to the traveler based upon the estimated remaining duration to enable the traveler to assess when the traveler needs to commence the transfer segment of the trip from the first location to the second location.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIGS. 7A-7C are block diagrams illustrating the determination of hurry status indications for green, yellow and red statuses, respectively, in the system of FIGS. 1-2.

DETAILED DESCRIPTION

Figure 1:
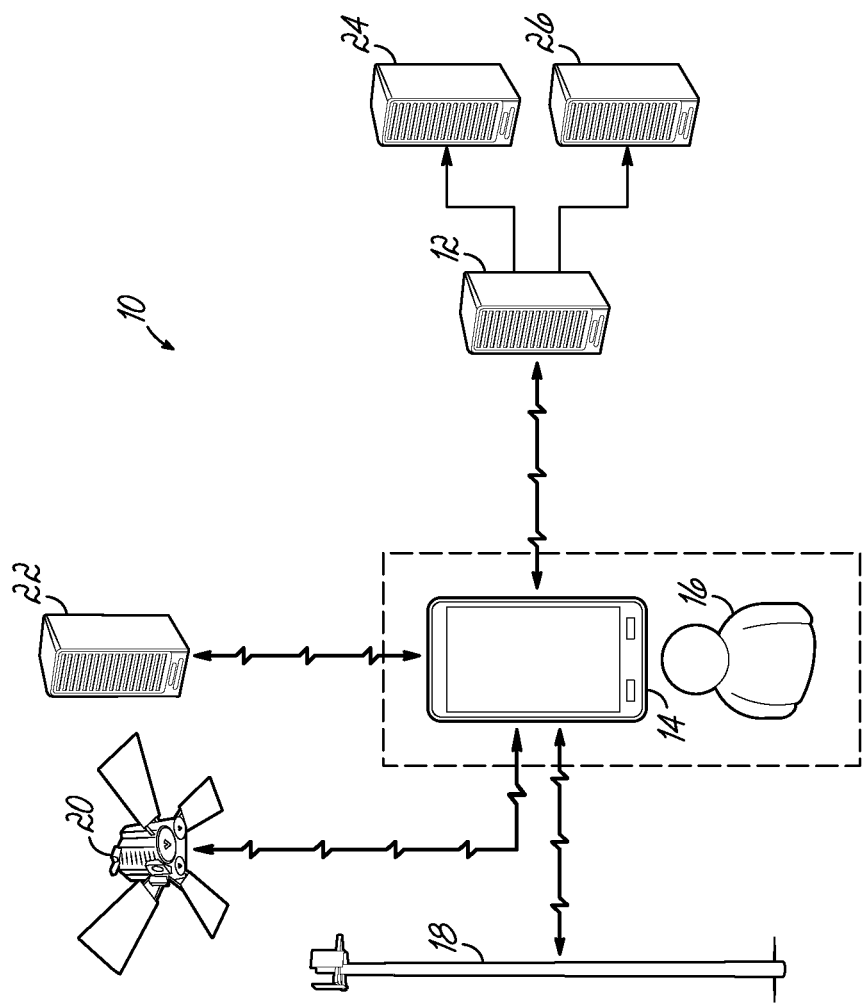
FIG. 1 is a schematic illustration of an exemplary system suitable for implementing traveler hurry status monitoring consistent with one embodiment of the present invention.

Embodiments consistent with the invention provide a traveler hurry status monitoring system that typically reduces the stress experienced by travelers in uncertain situations and desiring to ascertain when they need to commence a transfer segment of a trip from their current location to a point of departure for a passenger vehicle upon which the traveler is scheduled to depart, or otherwise upon which the traveler desires to depart, to ensure that the traveler is able to board and depart with the passenger vehicle.

In this regard, a trip may be considered to incorporate any planned travel of a traveler between two geographic locations. A trip may include multiple segments, and as such, a trip segment may represent the travel of a traveler on a passenger vehicle, e.g., a passenger vehicle for which the traveler has purchased a ticket or otherwise intends on boarding and riding. Moreover, within the context of the invention, a trip segment may also represent the transfer of the traveler from his or her current location to a point of departure for a passenger vehicle for which the traveler has purchased a ticket or otherwise intends on boarding and riding. This latter type of trip segment, which may be referred to hereinafter as a transfer segment, may encompass traveling via one or more modes of transportation, e.g., a car, a bus, a taxi, a subway, etc. to the point of departure, such as an airport, train station or other terminal, along with any other activities ancillary to boarding and departing on the passenger vehicle for a subsequent trip on that passenger vehicle, e.g., passing through a security checkpoint, walking or riding through the terminal, checking in with a carrier, etc.

Furthermore, commencing a trip within the context of the invention, and in particular commencing a transfer segment of a trip, is considered to encompass leaving a current location at which the traveler is currently disposed in order to initiate a planned trip on one or more passenger vehicles upon which the traveler has purchased a ticket, is scheduled, or is otherwise planning on riding. While embodiments consistent with the invention may also have utility in tracking a traveler's current location and status after the traveler has commenced a transfer segment from the traveler's current location to the point of departure for a passenger vehicle, as well as for additional trip segments such as later connecting flights or trains, it is important to note such embodiments also provide a hurry status indication to a traveler prior to commencing any trip to assist a traveler in determining whether the traveler needs to commence the trip in order to travel on the passenger vehicle, how much time the traveler has remaining before he or she should commence the trip, and/or whether insufficient time remains and the traveler needs to reschedule on a later passenger vehicle. In this regard, a traveler may be considered to have not yet commenced a trip or the transfer segment of such a trip when the traveler is located at his or her home, at his or her office, at a hotel or other lodging facility, at a client or customer facility, or otherwise when the traveler has not yet physically departed for the point of departure.

A hurry status indication consistent with the invention may indicate, for example, a duration remaining before the traveler needs to commence a trip, a time of day when the traveler needs to commence a trip, a status (e.g., you have plenty of time, you need to leave soon, or you are not going to make it in time), an indicator corresponding to a degree of urgency (e.g., conveyed via different colors such as green, yellow and red). Embodiments consistent with the invention may, for example, communicate the hurry status indication to the traveler by displaying the indication or information related to the indication on the traveler's mobile device, or simply by communicating the indication to the mobile device. In addition, in addition to or as an alternative to displaying the indication to the traveler, audible information may be communicated to the traveler, the mobile device may be caused to vibrate, etc.

A hurry status indication consistent with the invention is based at least in part on an estimated remaining duration that corresponds to when the traveler needs to commence the trip to ensure that the traveler will be able to board and travel on the passenger vehicle. The estimated remaining duration may be based at least in part on an estimated transfer duration, which typically relates at least in part to an estimated travel duration required for the traveler to travel from a first location proximate his or her current location to a second location proximate a point of departure for a passenger vehicle upon which the traveler intends to travel. This estimated travel duration may be determined dynamically, and based upon one or more modes of transportation used for the transfer, e.g., car, taxi, bus, train, subway, etc., as well as any real-time delay information associated with such modes of transportation, e.g., known traffic delays and/or known delays in scheduled public transportation vehicles.

Furthermore, in some embodiments, the estimated transfer duration may be based at least in part upon a processing duration, which typically relates to an expected amount of time for the traveler, once arriving at the second location, to be processed and permitted to board and depart on the passenger vehicle. For example, where the passenger vehicle is an airplane, the processing duration may include a check-in duration associated with the traveler checking in at a ticketing kiosk or station, a security check duration associated with the traveler passing through a security checkpoint (potentially differing between domestic and international checkpoints), a boarding duration associated with the traveler traveling to a departure gate and boarding the passenger vehicle, and/or additional durations associated with other activities required to board the passenger vehicle in a timely manner, e.g., durations associated with returning a rental vehicle, walking or riding between different locations in an airport terminal such as from a rental return area to a ticketing station, from a ticketing station to a security checkpoint, or from a security checkpoint to a departure gate (i.e., a departure gate duration), etc. It will be appreciated for passenger vehicles other than airplanes, other combinations of time periods may be incorporated into an estimated transfer duration, e.g., time required to travel through a train terminal, a ferry terminal, a ship terminal, etc.

Any of the aforementioned durations may be based in different embodiments based upon real-time information, historical information, rules associated with a particular point of departure (e.g., airport, train station, ferry terminal, ship terminal, etc.) or a particular carrier (e.g., airline-specific rules). Portions of an estimated transfer duration may be static estimations that are common to all situations, or may be specific with regard to particular locations, modes of transportation, carriers, etc., and various durations may be combined in some embodiments. For example, in one exemplary embodiment, the duration required for a traveler, once arriving at airport, to travel through the airport, check-in at a ticketing station, pass through a security checkpoint and travel to the departure gate may be represented by a single duration that is based on historical information particular to that airport. In another embodiment, the duration may be based on a combination of a static duration component associated with traveling through an airport except for through a security checkpoint and a dynamic duration component associated with a security checkpoint, the latter of which may be determined either via real-time monitoring of the security checkpoint or historical delay information associated with the time of day during which the traveler is expected to be passing through the security checkpoint. In still another embodiment, rules associated with a carrier or a point of departure, which may be determined, for example, by accessing an itinerary for the traveler, may be used in a determination, e.g., when an airline or an airport dictates that a traveler be at a departure gate at least 10 minutes before an airplane's scheduled takeoff.

A passenger vehicle, within the context of the invention, may include practically any land, air, water or space vehicle for which a traveler either has a reservation or is otherwise scheduled to depart from a particular point of departure at a predetermined time, irrespective of whether the traveler already has a reservation therefor, e.g., a private or commercial airplane, a train or other rail vehicle, a cruise ship, a ferry, a space vehicle, etc. It should be noted that while such passenger vehicles are typically scheduled to depart at a specific time, a hurry status indication may be based upon real-time delay or departure information associated with passenger vehicle, e.g., allowing a traveler additional time to commence a trip if a passenger vehicle is already known to be delayed based upon a predicted time of departure. A point of departure, in this regard may include an airport, a train station or terminal, a ferry terminal, a ship terminal, or any other predetermined location from which a passenger vehicle may disembark.

Some embodiments consistent with the invention may also include a warning buffer to provide a cushion to account for unaccountable situations. A warning buffer may be used, for example, to change a hurry status indication from a first status, where there is no concern about arriving at the point of departure in sufficient time, to a second status, where the traveler is encouraged to commence the trip to ensure departure on the passenger vehicle, when the estimated remaining duration falls within the warning buffer. The warning buffer may be a static duration in some embodiments, or may be variable based upon historical information and/or real-time information, e.g., so that during periods in which unexpected situations are more likely to occur, such as when a traveler is going to be transferring during rush hour, a larger buffer may be provided. It may also be desirable to make the warning buffer configurable, e.g., by the traveler.

Some embodiments consistent with the invention may also include rescheduling functionality to enable a traveler, when the estimated remaining duration is less than or equal to zero, to be informed of a missed departure, and to view alternate passenger vehicles departing at a later time. In some embodiments, a traveler's reservation or itinerary may be automatically changed to select a different passenger vehicle. The traveler may be required to validate the change prior to rescheduling, while in some embodiments the rescheduling may occur without traveler validation. The alternate passenger vehicle may be on the same carrier, on a different carrier, a different mode of transportation, departing from a different point of departure, etc., and the hurry status indication may be automatically updated in response to rescheduling the traveler. It should be noted that in some instances, it may be desirable to base rescheduling decisions on factors other than simply departure time, e.g., so that a train that departs earlier than a next flight but arrives at the destination later is not suggested.

As will become more apparent from the description below, embodiments consistent with the invention may be implemented in a central service implemented in one or more computers, in a mobile device such as a smart phone, laptop computer, tablet, or any other computing device accessible to a traveler, or in any combination of the same. In one embodiment, for example, a central service may receive geolocation data such as GPS data from a mobile device and calculate the estimated remaining duration, the estimated transfer duration, and the hurry status indication, such that communicating the hurry status indication to the traveler entails communicating the hurry status indication to the mobile device for eventual display by the mobile device to the traveler. In another embodiment, the hurry status indication, the estimated remaining duration and/or the estimated transfer duration may be calculated by a mobile device, such that communicating the hurry status indication to the traveler entails displaying the hurry status indication on the mobile device. Other embodiments may allocate different functionalities to the central service, to a mobile device, and/or to additional ancillary services such as direction engines, reservation engines, status engines, etc. consistent with the invention. Therefore the invention is not limited to the particular implementations discussed herein.

Other variations and modifications will be apparent to one of ordinary skill in the art.

Hardware and Software Environment

Turning now to the drawings, wherein like numbers denote like parts throughout the several views, FIG. 1 illustrates an exemplary data processing system 10 in which a traveler hurry status monitor may be implemented. System 10 is illustrated as including a central service implemented by one or more computers 12, as well as one or more mobile devices 14 for one or more travelers 16 and coupled to the central service. Each mobile device 14 typically includes connectivity to a mobile service network 18, e.g., a GSM, LTE, CDMA or other cellular network. In addition, each mobile device 14 may include geolocation functionality, e.g., via receiving GPS signal data from a GPS network 20.

The central service typically coordinates hurry status monitoring, and includes one or more computers 12 coupled to mobile device 14 through a public or private network such as the Internet, with various functions associated with hurry status monitoring allocated between the central service and mobile device 14 for a particular traveler. In addition, the central service and/or mobile device 14 may rely on additional services in order to perform hurry status monitoring, e.g., an itinerary service or engine 22, from which a traveler's itinerary may be retrieved, a booking service or engine 24 from which schedule information may be obtained and a traveler may book, modify, cancel or rebook a reservation, and a directions engine or service 26 from which information may be retrieved to determine an estimated remaining duration for a traveler given the traveler's current location.

Figure 2:
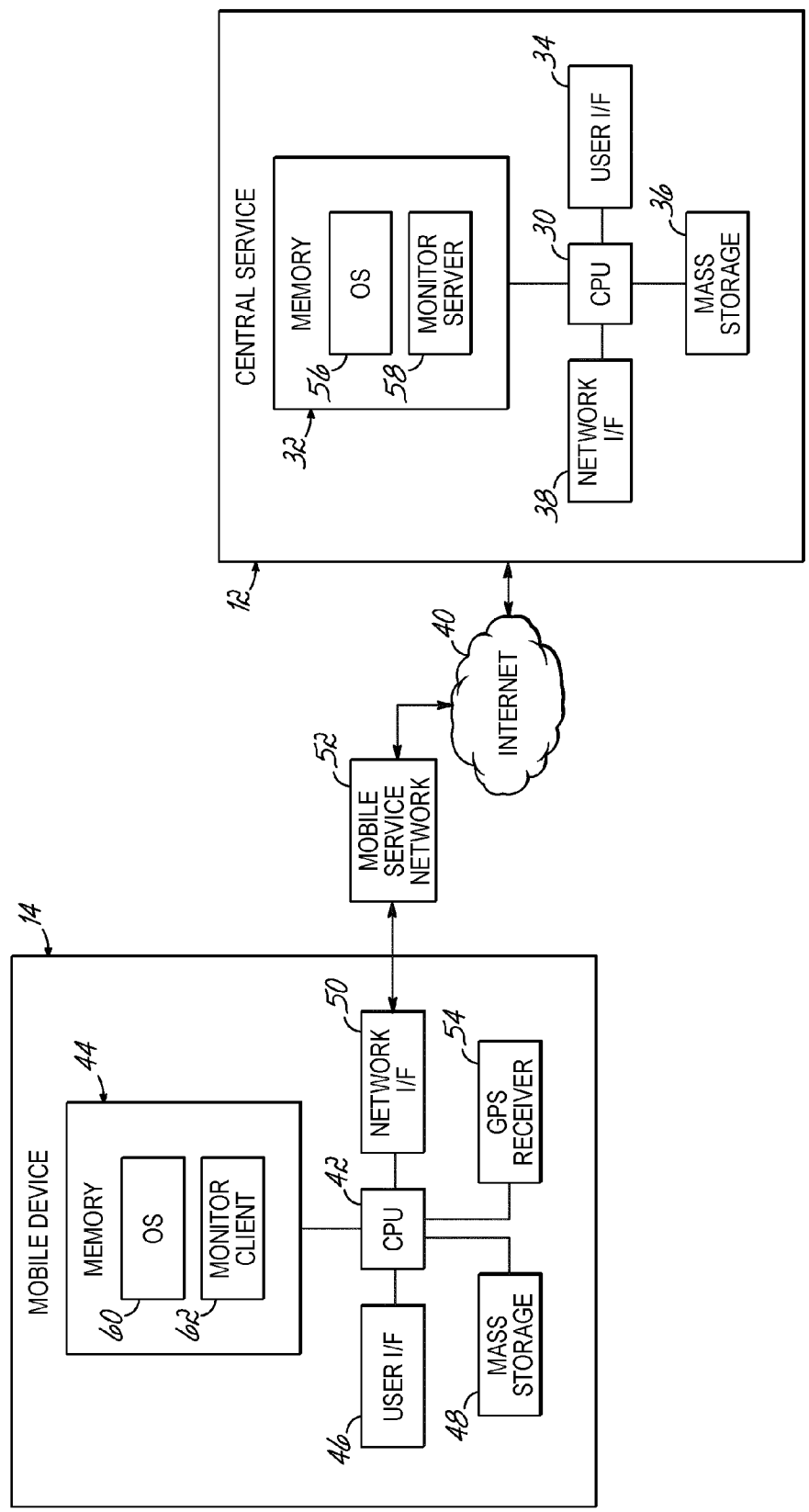
FIG. 2 is a block diagram of an exemplary hardware and software implementation of the system of FIG. 1.

As illustrated in FIG. 2, a central service may be implemented by one or more server-type computers 12, e.g., multiple computers coupled to another in a clustered or other distributed architecture. Each computer 12 typically includes a central processing unit 30 including at least one hardware-based microprocessor coupled to a memory 32, which may represent the random access memory (RAM) devices comprising the main storage of computer 12, as well as any supplemental levels of memory, e.g., cache memories, non-volatile or backup memories (e.g., programmable or flash memories), read-only memories, etc. In addition, memory 32 may be considered to include memory storage physically located elsewhere in computer 12, e.g., any cache memory in a microprocessor, as well as any storage capacity used as a virtual memory, e.g., as stored on a mass storage device or on another computer coupled to computer 12. Computer 12 also typically receives a number of inputs and outputs for communicating information externally. For interface with a user or operator, computer 12 typically includes a user interface 34 incorporating one or more user input devices, e.g., a keyboard, a pointing device, a display, a printer, etc. Otherwise, user input may be received via another computer or terminal, e.g., over a network interface 38 coupled to a network such as internet 40. Computer 12 also may be in communication with one or more mass storage devices 36, which may be, for example, internal hard disk storage devices, external hard disk storage devices, storage area network devices, etc.

Similar to computer 12, mobile device 14 includes a central processing unit 42, memory 44, user interface 46, mass storage device 48 and network interface 50, albeit specifically configured for use in a mobile device such as a mobile phone, tablet or smart phone. Connectivity to the central service may be provided, for example, via a mobile service network 52 and/or via a WiFi radio. Mobile device 14 may also include geolocation hardware such as a GPS receiver 54, or geolocation data may be derived in other manners, e.g., via mobile service network 52. It will be appreciated that mobile device 14 may alternately be implemented by any other computer or programmable electronic device capable of being accessed by a traveler, including, for example, a public kiosk, a desktop computer, a laptop computer, a television or set top box, a game console, etc.

Computer 12 typically operates under the control of an operating system 56 and executes or otherwise relies upon various computer software applications, components, programs, objects, modules, data structures, etc., e.g., a monitor server 58, as will be described in greater detail below. Likewise, mobile device 14 typically operates under the control of an operating system 60 and executes or otherwise relies upon various computer software applications, components, programs, objects, modules, data structures, etc., e.g., a monitor client 62, as will be described in greater detail below. Moreover, various applications, components, programs, objects, modules, etc. may also execute on one or more processors in another computer coupled to computer 12 or mobile device 14 via a network, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution.

Such computer readable media may include computer readable storage media and communication media. Computer readable storage media is non-transitory in nature, and may include volatile and non-volatile, and removable and non-removable media implemented in any method or technology for storage of information, such as computer-readable instructions, data structures, program modules or other data. Computer readable storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium that can be used to store the desired information and which can be accessed by computer 12 and/or mobile device 14. Communication media may embody computer readable instructions, data structures or other program modules. By way of example, and not limitation, communication media may include wired media such as a wired network or direct-wired connection, and wireless media such as acoustic, RF, infrared and other wireless media. Combinations of any of the above may also be included within the scope of computer readable media.

In one implementation, monitor client 62 may be implemented as a downloadable application, such as supported by Android and iOS operating systems available from Open Handset Alliance and Apple Computer, respectively, or in other forms of program code as appropriate for the particular mobile device. A monitor client 62 may also be implemented as a web application downloaded from monitor server 58, or even via web pages communicated by monitor server 58. Furthermore, multiple mobile devices and operating systems may be supported by a central service consistent with the invention such that mobile devices from different vendors may utilize the same central service.

It will be appreciated that the allocation of functionality between mobile devices 14 and the central service may vary in different embodiments. Therefore, the invention is not limited to the various embodiments disclosed herein.

Various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Traveler Hurry Status Monitoring

In the embodiment discussed hereinafter, a mobile application resident on a mobile device 14 and functioning as a monitor client displays to a traveler a hurry status indication that may include, for example, a color indicator indicating whether an estimated remaining duration for a traveler is outside of a warning buffer (e.g., green), is within a warning buffer (e.g., yellow), or is beyond a warning buffer (e.g., red). In addition, the hurry status indication may include a time remaining and/or a deadline time enabling a traveler to quickly and easily ascertain when the traveler needs to commence a trip, and in particular a transfer segment thereof, in order to successfully board a scheduled passenger vehicle, e.g., an airplane, prior to departure. In addition the mobile application may be configured with additional functionality enabling the traveler to search for alternate flights, change his or her reservation, retrieve other itinerary information, etc. A monitor server in the central service is used to reduce the processing overhead of the mobile application by calculating all or a portion of the data required to assess the hurry status indication and to enable the hurry status indication to be displayed to a traveler. As will become more apparent below, the allocation of data processing functionality between the mobile application and the central service may vary in different embodiments.

In one embodiment of the invention, a mobile application may be used to provide a traveler with a visual hurry status indication, based, for example, on colors, icons and/or textual information. In addition, accessibility support may be provided via alternate visual displays, audible indications and/or vibration indications. Furthermore, text messages, emails and other electronic communications may be used. The mobile application may be protected by a password, may enable a traveler to select a mode of transport to an airport (e.g., car, bus, motorbike, taxi, train, subway, etc.). The mobile application may also enable registration of travel agency contact details, configuration of a maximum delay before departure to start displaying hurry status indication, and import or entering of an itinerary for the traveler.

The application, once opening, may then be able to identify the next flight taking off or the next train leaving and display the corresponding hurry status indication. Typically, past air or rail segments are ignored, and if the operation the traveler wants to perform is not a status check, a menu may be provided to allow him or her to access other applications features. Also, in some implementations user authentication may be required prior to starting the application. All trips uploaded or imported into an application may be accessed to check any information or for modification purposes.

One implementation of a traveler hurry status monitor consistent with the invention is illustrated in FIGS. 3-6, and principally for use in connection with air travel. It will be appreciated that the invention is not limited to air travel, and as such, the description hereinafter is merely exemplary in nature. For the purposes of these figures, a number of roles are defined as follows:

Traveler

The traveler is the user of a mobile device, e.g., a smart phone, tablet or other device with a display and data network access, upon which the monitor client may be executed.

Monitor Client

The monitor client is installed on the traveler's mobile device, and is used by the traveler to interact with all the features of the monitor system, e.g., review a trip, get hurry status indication, check next flights, change reservation. The monitor client typically determines the traveler's location based upon GPS, WiFi or GSM networks.

Monitor Server

In the illustrated embodiment, the monitor server is responsible for recurrent status processing to minimize data exchange with the monitor client. The connection between the monitor client and the monitor server may be achieved based upon an HTTP protocol, JSON data format and other networking or data standards.

The monitor server is typically responsible for the access to external systems such as a booking engine, a directions engine and an airport data server. The connections between the monitor server and these external systems will typically depend on the protocol used by the implementations of these external systems, e.g., using SOAP web services or other formats.

Trip Retrieval Application

The trip retrieval application may be a mobile application used to retrieve details for a trip and one or more segments thereof associated with a reservation. An example of a trip retrieval application is the CheckMyTrip Mobile Companion available from Amadeus S.A.S.

Booking Engine

This system allows a user or another system to retrieve a flight reservation, flight information (e.g. delays) and airline rules, search for flights and modify a reservation. An example of a booking engine is Amadeus e-Travel Management available from Amadeus S.A.S.

Directions Engine

This system allows a user or another system to compute itineraries with estimated duration between two locations (geo-coordinates or addresses) based on a mode of transportation (e.g. car or train). It may also take into account road traffic conditions, rail delays, or other real-time delay information while calculating an itinerary. An example of a directions engine is Google Maps.

Airport Data Server

The airport data server is an external system (e.g., a server publishing a web service, a database, or any source of data) providing information related to airports, e.g., airport rules or real-time or historical information associated with security checkpoint delays, boarding delays, etc.

Figure 3:
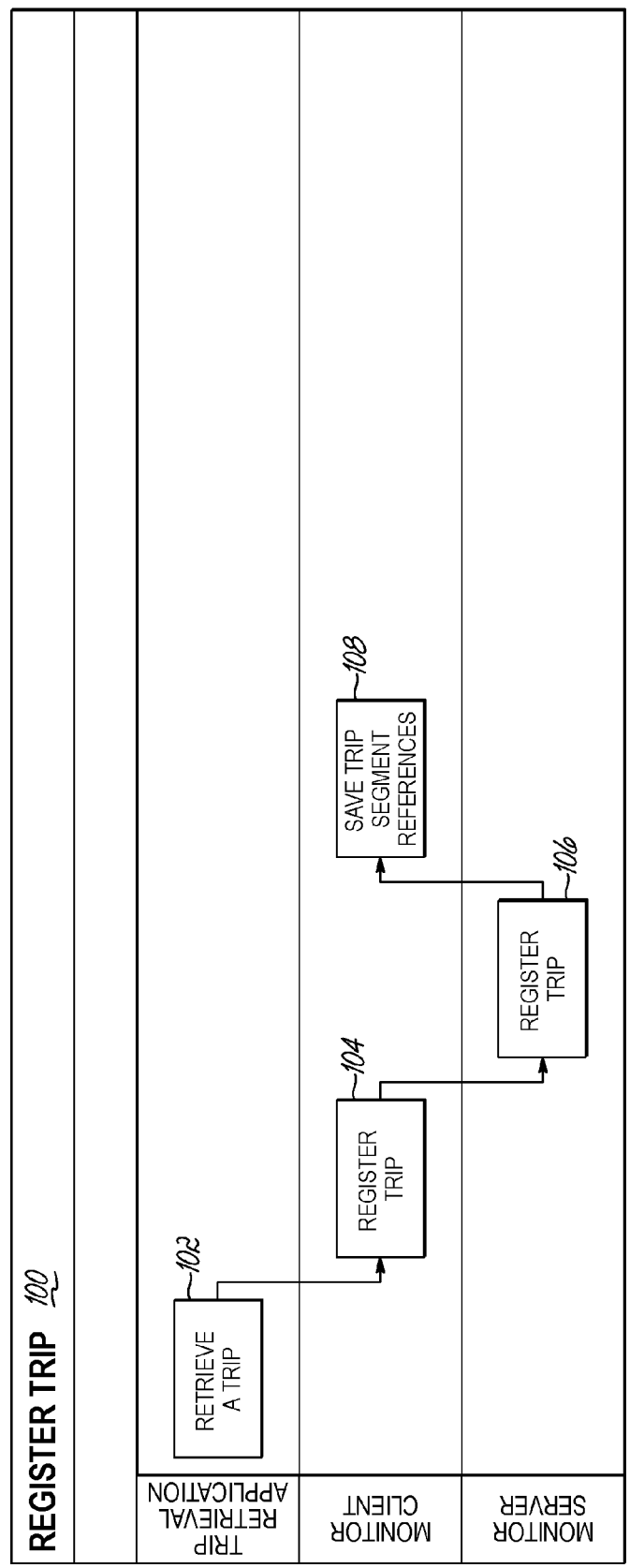
FIG. 3 is a flowchart illustrating an exemplary sequence of operations for registering a trip in the system of FIGS. 1-2.

FIG. 3 illustrates an exemplary register trip routine 100 implemented by system 10 in order to register a traveler's trip with the system for hurry status monitoring. In this routine, the trip retrieval application, upon a traveler's request, retrieves a trip from a trip record associated with a traveler's reservation (block 102), including various travel elements (flights, train, car, hotel, and other services) associated with the trip. Next, the monitor client, upon notification by the trip retrieval application, registers the identification and details with the monitor client (block 104), and forwards a registering request to the monitor server to similarly register the trip for monitoring by the monitor server. The monitor server, in block 106, then extracts the trip segments from the trip and registers each under a unique reference that may be used later on to identify a trip segment during exchanges between the monitor client and server. It will be appreciated that the initial, transfer segment of a trip is typically not registered separately, as this segment is indeterminate and based upon where the traveler is located at a given time relative to the point of departure for the first registered segment of the trip.

Next, in block 108, the monitor server responds to the monitor client request with the trip segments associated with the trip to enable the monitor client to register the trip segment details and generated references provided thereto by the monitor server. Routine 100 is then complete.

Figure 4:
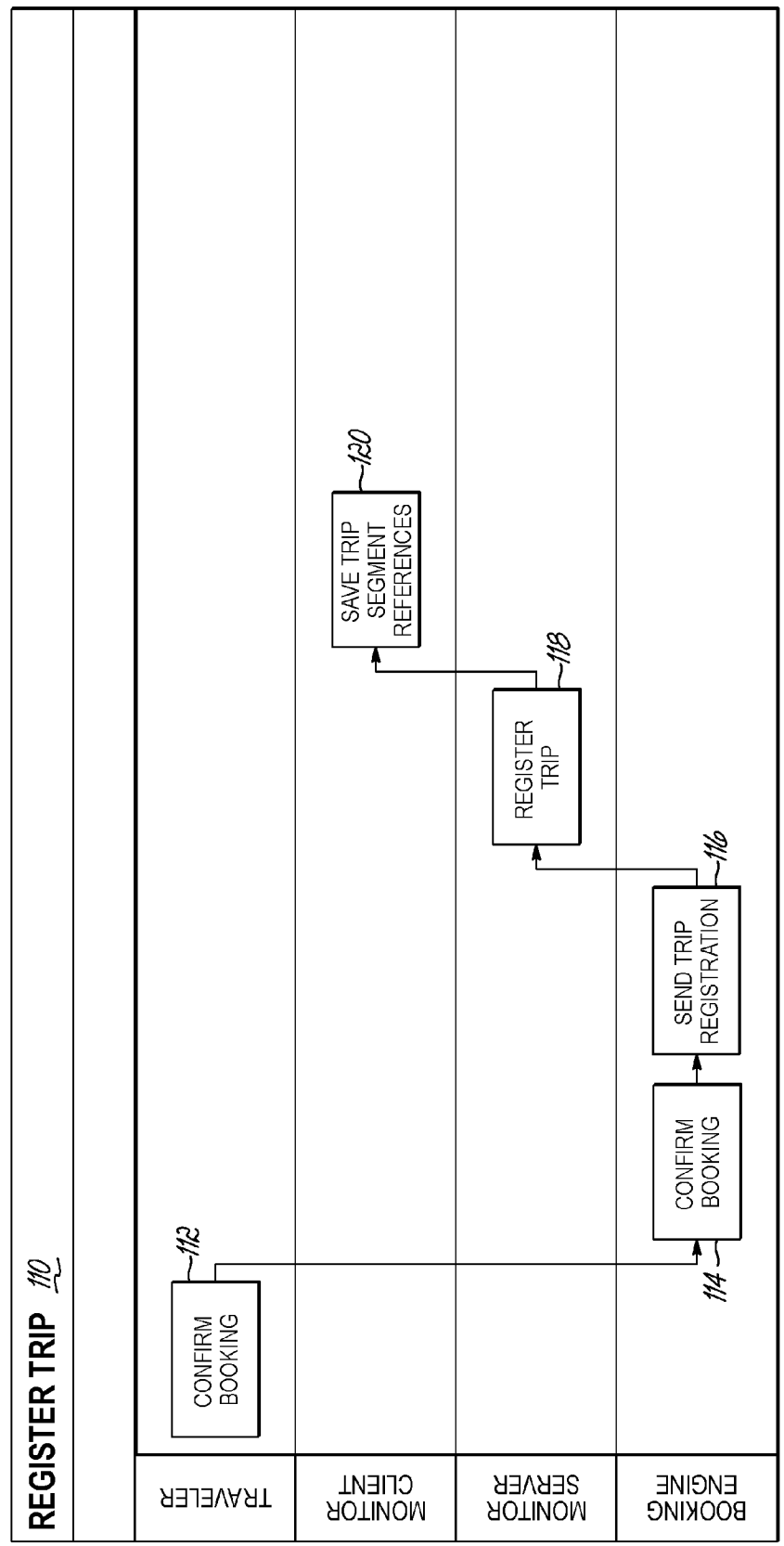
FIG. 4 is a flowchart illustrating another exemplary sequence of operations for registering a trip in the system of FIGS. 1-2.

Alternatively, as illustrated by routine 110 of FIG. 4, a trip may be registered in response to a traveler booking a trip. Specifically, in response to a traveler confirming a travel booking on a booking engine (blocks 112, 114), the booking engine may register the trip with the monitor server (block 116). The selected travel elements (flights, train, car, hotel, and other services) may be confirmed in a trip record (e.g., a passenger name record, a database, etc.) and then forwarded as a register request to the monitor server in order to register the confirmed trip for monitoring. Thereafter, similar to block 106 of FIG. 3, the monitor server in block 118 extracts trip segments from the trip and registers each under a unique reference that may be used later on to identify a trip segment during exchanges between the monitor client and server. Then, similar to block 108 of FIG. 3, the monitor client in block 120 registers the trip segment details and generated references provided thereto by the monitor server. Routine 110 is then complete.

Figure 5:
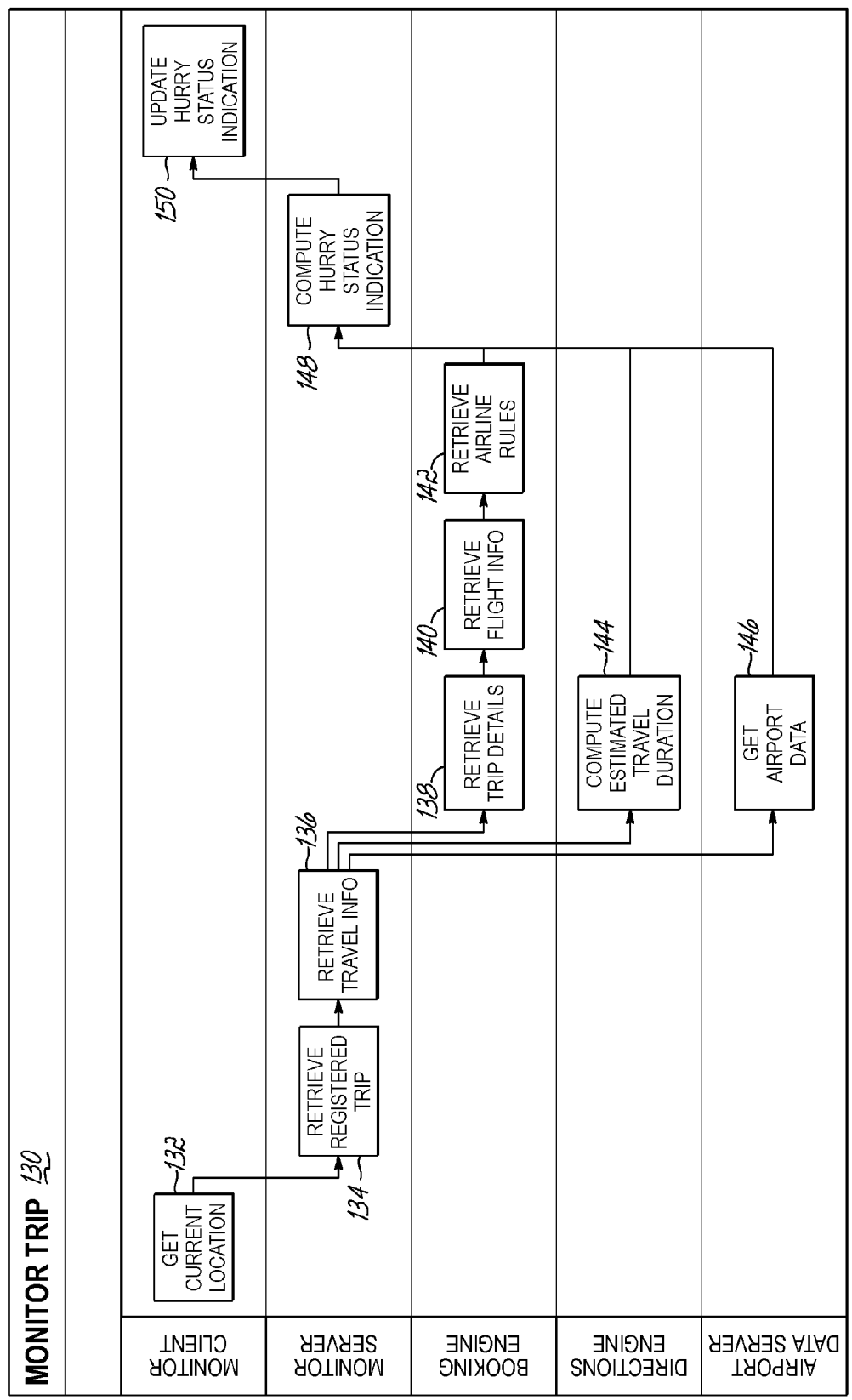
FIG. 5 is a flowchart illustrating an exemplary sequence of operations for monitoring a trip in the system of FIGS. 1-2.

Once a trip is registered for a traveler, a monitor trip routine 130, e.g., as illustrated in FIG. 5, may be used to determine a hurry status indication for a traveler. Routine 130 is initiated when monitor client 132 obtains a current location for the traveler, e.g., based upon GPS data or other geolocation information associated with the mobile device (block 132). The mobile client then forwards a request for a hurry status indication to the monitor server.

In response to the request, the monitor server retrieves the register trip associated with the traveler (block 134). In some embodiments, the monitor server may also include a scheduled task that is initiated a predetermined time before a registered trip (e.g., 24 hours prior), such that a hurry status indication may be determined without being triggered by a request from a monitor client.

Next, in block 136, the monitor server retrieves travel information required to determine the hurry status information. The travel information may be retrieved locally, as well as from one or more external services. In this embodiment, for example, the monitor server may contact a booking engine, a directions engine and/or an airport data server to retrieve appropriate travel information.

For example, from a booking engine, the monitor server may retrieve up-to-date trip details from a trip record, e.g., the trip segments (start location, end location, start date, end date, operator identifier, flight/train number), paid amount, modification and cancellation allowance, etc. (block 138). In addition, the booking engine may be accessed to retrieve flight information, e.g., the status of specific flights, flight delays, boarding gate information, etc. (block 140). Furthermore, the booking engine may be accessed to retrieve airline or carrier rules from the trip record, e.g., the end of boarding time, remarks, etc. (block 142).

From a directions engine, the monitor server may retrieve an estimated travel duration, which is determined or computed in block 144. The estimated travel duration is based on two locations A (traveler's current location) and B (airport location), and may include determining a route from A to B, based on the traveler's selected mode of transportation (car, bus, train, walk, etc.), and typically accounts for real-time delay information such as traffic delays, train delays, etc. The total estimated duration to reach the location B from location A is returned by the directions engine.

From an airport data server, the monitor server may retrieve airport data in block 146, e.g., rules associated with a minimum time needed at the airport before flight departure, min/max/average check-in duration, duration to go through the security checkpoints (segregated by domestic and international), duration to go through customs, etc. In addition, if supported by an airport data server, historical or real-time data may be provided, e.g., to permit the monitor server to account for historical durations at the airport or any durations monitored in real-time by the airport. It will be appreciated that the various travel information may be retrieved from external services in parallel.

Based upon the retrieved travel information, the monitor server then, in block 148, computes or determines a hurry status indication. The indication is then forwarded to the mobile client, which then updates, and typically displays this indication in block 150. If the mobile client is not currently running, the indication may be stored locally on the mobile device for later display. In addition, in response to a change in status, a notification may be triggered on the mobile device, e.g., a notification, an alert, a badge, a message, an audible sound, a blinking LED, a vibration, etc. Routine 130 is then complete.

Figure 6:
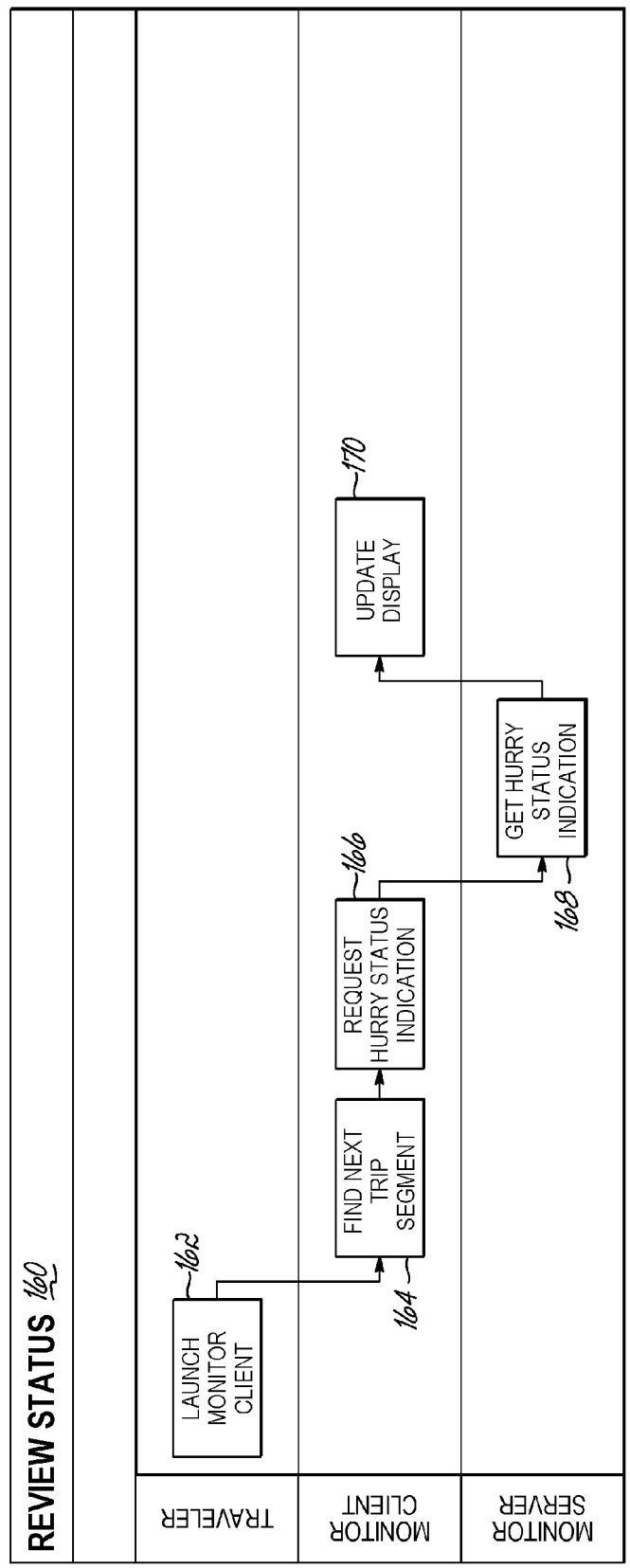
FIG. 6 is a flowchart illustrating an exemplary sequence of operations for reviewing a status in the system of FIGS. 1-2.

FIG. 6 next illustrates a review status routine 160 performed by the system when a traveler wishes to review his or her hurry status. In block 162, the traveler launches the mobile client, causing the mobile client, in block 164, to retrieve the next trip segment, which, before the traveler has commenced the trip, refers to the first trip segment associated with a scheduled passenger vehicle, rather than the transfer segment associated with traveling from the traveler's current location to the airport or other terminal for commencing the trip segment associated with the passenger vehicle scheduled to depart from that airport or terminal. For a trip from New York to Nice, for example, the first segment may be a flight from New York to Paris, and the second segment may be from Paris to Nice and may be a rail segment or air segment. In some implementations, it may be desirable to monitor each segment independently.

Next, in block 166 the monitor client requests the hurry status indication from the monitor server, which is then computed by the monitor server in block 168 in the manner described above in connection with FIG. 5. The hurry status indication is returned to the monitor client, resulting in the display of the associated mobile device being updated with the current hurry status indication in block 170. Routine 160 is then complete.

The manner in which the hurry status indication may be implemented and determined may vary in different embodiments. In the embodiment discussed below, for example, the hurry status indication includes a status indicator and a remaining duration before the next status/segment. Each hurry status indicator desirably includes a color and an associated short message that may be as follows:

Green: You still have time.
Yellow: You must leave before X minutes.
Red: You will probably miss your flight.

In this embodiment, in order to compute the hurry status indication, the following information may be retrieved from several sources, including, for example:

Current user location, obtained from GPS.
Estimated travel duration, e.g., for transfer in a car, a driving itinerary and duration, taking into account road traffic, as determined by a directions engine based on a mode of transportation selected by the traveler via the monitor client.
Flight departure time, retrieved from a trip record.
Time for end of boarding, retrieved from an airline rule from the traveler's ticket or reservation.
Time for end of check-in, retrieved from an airline rule from the traveler's ticket or reservation.
Required time to pass the security checks at the airport, e.g., approximated by a constant or via airport specific rules retrieved from an airport data server.
A "warning buffer," typically configurable by the traveler via the monitor client.
Current time, obtained from the traveler's mobile device.

Using the information above, the monitor client and/or monitor server application adds all the estimated durations (estimated travel duration for traveling to the airport, check-in duration for completing check-in, security check duration for passing through security checkpoint, "warning buffer", etc.) and, based on "milestone times" (flight departure, end of boarding, end of check-in) and the current time, determines the hurry status indication. In addition, the hurry status indication may be based upon an estimated remaining duration that is determined based upon the estimated durations, the flight departure and the current time.

FIGS. 7A-7C illustrate how the estimated durations and milestones are put together to compute the status indicator. FIG. 7A, for example, illustrates a first, "green" status, where the estimated remaining duration from the current time ("now") is greater than a warning buffer added to an estimated transfer duration for the traveler to travel from his or her current location to the airport and board an airplane prior to departure. FIG. 7B illustrates a second, "yellow" status, where the estimated remaining duration from the current time is less than the warning buffer, while FIG. 7C illustrates a third, "red" status, where the estimated remaining duration is less than zero, and the current time is beyond the estimated transfer duration.

Put another way, the hurry status indication may be determined formulaically as follows:

"Remaining time (duration)"="Flight departure time"−("boarding duration"+"security checks duration"+"check-in duration"+"estimated travel duration")−"Current time"

The hurry status indication may then be set as green (OK) if "Remaining time (duration)">"warning buffer duration", as yellow (WARN) if 0<"Remaining time (duration)"<="warning buffer duration", and as red (KO) if 0>="Remaining time (duration)".

Figure 8A:
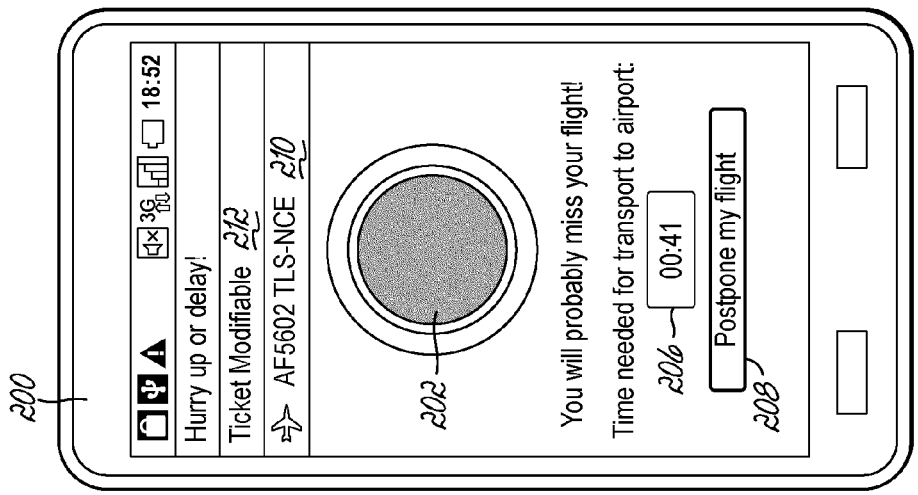
FIGS. 8A-8C are block diagrams illustrating a display on a mobile device corresponding to hurry status indications for green, yellow and red statuses, respectively, in the system of FIGS. 1-2.
Figure 8B:
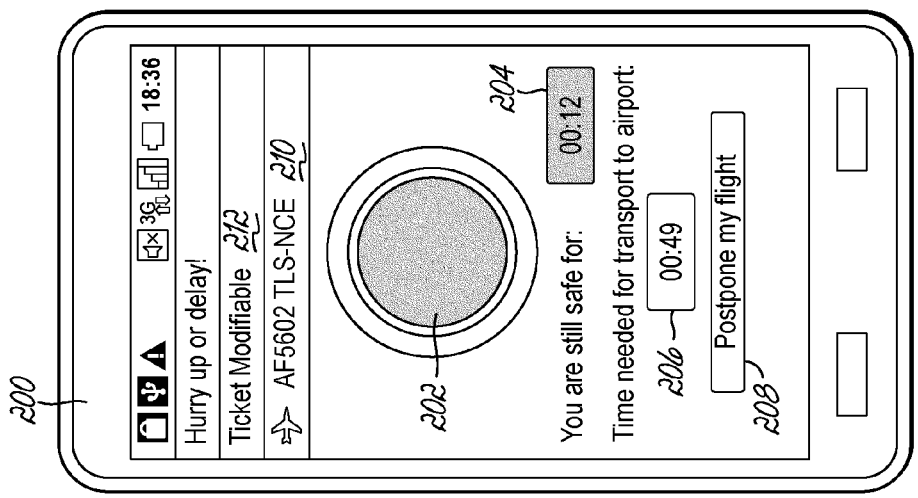
Figure 8C:
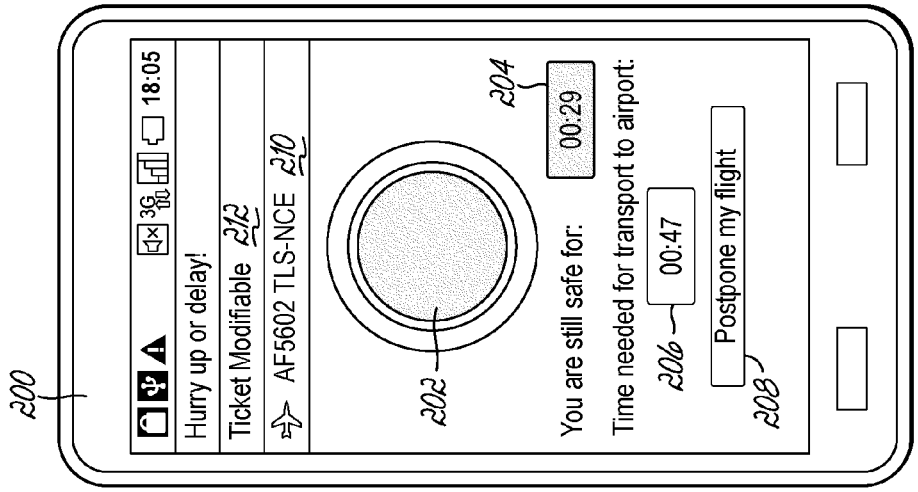

FIGS. 8A-8C respectively illustrate displays that may be generated by a monitor client on a mobile device to display a hurry status indication to a traveler. FIG. 8A, for example, illustrates a display 200 including a large circular indicator 202 displayed in green to represent a safe status for the traveler. In addition, a timer 204 may be displayed indicating the number of minutes to the next status, i.e., the start of the warning buffer. An additional timer 206 may also be displayed in some embodiments to indicate the amount of time needed for transport to the airport. In some embodiments, additional timers may also be displayed, e.g., to display estimated boarding, security checkpoint and/or check-in durations.

Furthermore, display 200 may include a button 208 to enable a traveler to search for later flights, and if desired, initiate rebooking on a later flight. Additional information, e.g., the identity of the current flight 210 and the modifiable status of the flight 212, may also be displayed. Selection of these identifiers may also enable a traveler to obtain more detailed information, if desired.

FIG. 8B illustrates display 200 after a transition has occurred to the next, yellow status. In this display, indicator 202 is displayed in yellow, and timers 204, 206 are updated with current information. Notably, timer 206 has been updated to indicate additional delays associated with traveling to the airport, e.g., due to an increase in traffic.

FIG. 8C illustrates display 200 after a transition has occurred to the next, red status. In this display, indicator 202 is now displayed in red, and timer 204 has been replaced with an indication that the traveler will likely miss his or her flight. At this point, the traveler may elect to rebook his or her flight by selecting button 208.

It will be appreciated that display 200 may be generated locally by a mobile device, or may be generated by a central service and communicated to the mobile device for display thereon. It will also be appreciated that implementation of the aforementioned functionality on a mobile device would be within the abilities of one of ordinary skill in the art having the benefit of the instant disclosure.

Additional functionality may be provided in a monitor client consistent with the invention. For example, a traveler may be presented with other durations, e.g., breaking out durations for travel to an airport, to get through security checkpoints, etc. A traveler may also be presented with options for viewing and/or automatically rebooking if the traveler desires to reschedule. In connection with rebooking, the traveler may view other scheduled departures, other modes of transportation (e.g., rail vs. air), upgrade/rebooking costs, whether the traveler's ticket is refundable or modifiable, modify penalties.

A traveler may also be able to view other travel-related information, including, for example, route information for the transfer to an airport or other terminal. Furthermore, a traveler may be able, via user-configurable settings, to specify what mode(s) of transportation should be used when calculating an estimated travel duration. The selection may be global, or may configured separately for each trip.

Figure 9C:
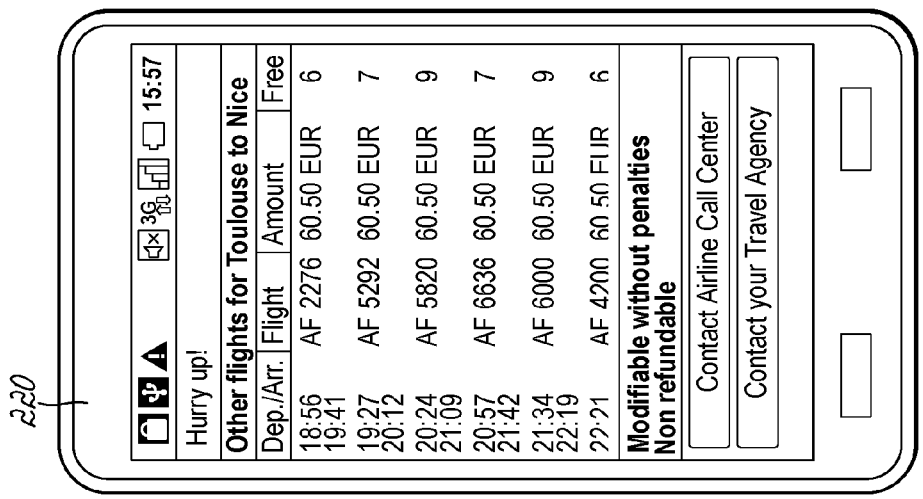
FIGS. 9A-9C are block diagrams illustrating a display on a mobile device in an exemplary usage scenario for the system of FIGS. 1-2.
Figure 9B:
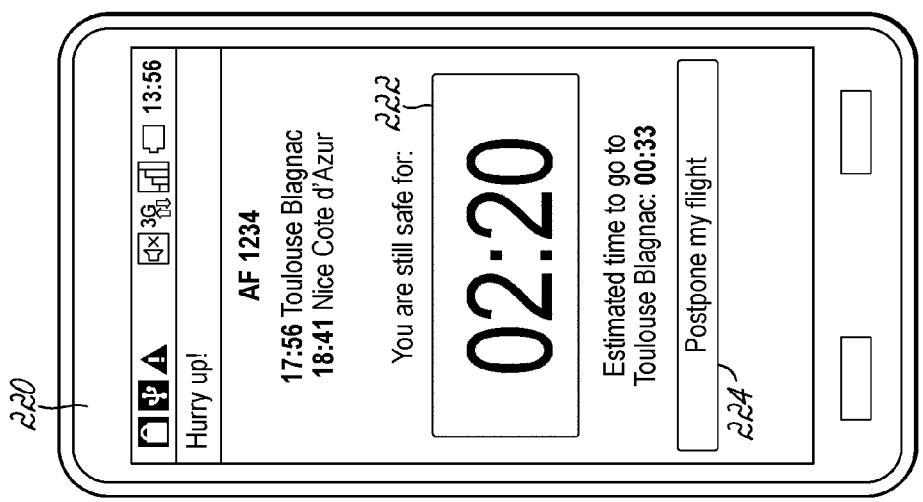
Figure 9A:
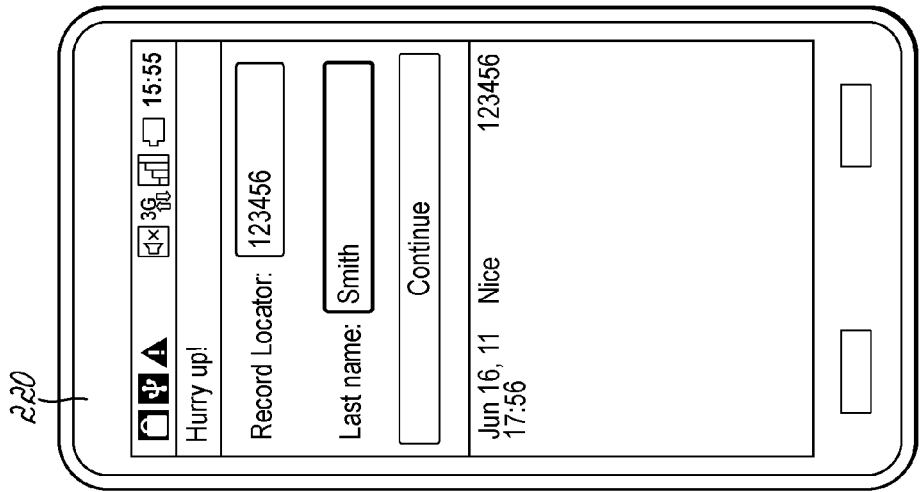

FIGS. 9A-9C are exemplary displays on a traveler's mobile device illustrating an exemplary scenario for which the aforementioned hurry status monitor system may be used. Assume, for example, that Mr. Smith, based in Nice, France, is not a frequent traveler. Next month, he needs to travel to Toulouse and has to book his trip using a self booking tool. He has not taken any business trips for a long time and feels a little bit nervous. Hopefully, this first step was much easier than expected and it did not take him much time to book a suitable flight and hotel. Indeed, Mr. Smith, having to attend a technical presentation in the morning, prefers to be in Toulouse the day before. The return flight is in the evening the same day because only the beginning of the afternoon is booked to meet an important client.

As with many people, Mr. Smith has a mobile phone and some useful mobile applications. When the web site he used to book proposed him to download a mobile application (monitor client) for a traveler hurry status monitoring system, he thought that it might help him for the return. He therefore downloaded the application and imported his trip, e.g., through an application market or by scanning a QR code displayed on a web page, which may also automatically import the booked trip in the downloaded application. As he understood it, no additional step would be required to help him not missing his return flight being assisted to take the airport transfer start decision, i.e., to commence a transfer segment of a trip home. FIG. 9A illustrates a display 220 of Mr. Smith's trip information, in particular a segment for a flight from Toulouse back to Nice.

One month later in Toulouse, the technical presentation, as scheduled, lasted the whole morning. It is now 14:00 and Mr. Smith is waiting for his client who is late. Mr. Smith has strong constraints and must absolutely be back in Nice this evening even if he arrives later than his initial schedule. Starting to envisage the various scenarios offered to him, he realizes many questions have to be answered before being able to decide which scenario would be the best one. He remembered the application and took his mobile phone always hooked on his belt. After having selected the application, he's presented with a display 220 (FIG. 9B) explaining him that for the next trip segment, which is flight AF1234 from Toulouse to Nice, he's still safe for more than 2 hours (displayed in timer 222) and that the estimated transfer duration is 33 minutes.

Tooltips may be used to remind Mr. Smith that the 33 minutes do take into account a traffic jam and that airport and airline rules are taken into account to go safely through all departure processing steps.

Mr. Smith, however, is still interested in finding out whether, if necessary, he could postpone his flight, and as such, he may select a "postpone my flight" button 224 displayed on the status screen (FIG. 9B), resulting in Mr. Smith being presented with a list of flights still available the same day with the number of remaining seats (FIG. 9C). The display also indicates that he can modify his trip without penalties, which suddenly calms him down. To be completely reassured, he may call his travel agency or an airline call center simply by selecting the corresponding button on the display.

Anyway, he'll probably not have to postpone as he just saw his client arriving at the reception. The meeting should not last more than two hours but he'll keep an eye on the status screen from time to time and has an easy mind fully dedicated to the meeting, knowing that in any case, he could always take a later flight.

It will be appreciated that various modifications may be made without departing from the spirit and scope of the invention. Any of the functionality disclosed herein may be implemented solely within a mobile device, solely within another computer or computer system, solely within a central service (e.g., with HTML pages served to a mobile device with the hurry status indication), or the functionality may be distributed to differing extends among these various entities. Alternate calculations and factors than those described herein may be utilized to determine an estimated remaining duration before a traveler needs to commence a trip. In addition, an estimated remaining duration need not be calculated directly, and may be determined by a traveler manually based upon another calculated value, e.g., an estimated time of day that the traveler needs to commence a trip. In such an event, a hurry status indication may be based on an estimated remaining duration in some embodiments even though the estimated remaining duration is not directly calculated.

Other modifications will be apparent to one of ordinary skill in the art having the benefit of the instant disclosure. Therefore, the invention lies in the claims hereinafter appended.

What is claimed is:

1. A method of monitoring a status for a traveler disposed at a first location and desiring to travel on a passenger vehicle that is scheduled to depart from a second location at a scheduled time, the method comprising:
   accessing a reservation for the traveler to retrieve details for one or more travel segments of a trip for the traveler, the one or more travel segments including a first travel segment for travel on the passenger vehicle from the second location at the scheduled time;
   registering the first travel segment for hurry status monitoring based upon the accessed reservation;

after registering the first travel segment for hurry status monitoring, and prior to the traveler commencing a transfer segment of a trip from the first location to the second location for departure on the passenger vehicle, determining using at least one processor an estimated remaining duration before the traveler should commence the transfer segment of the trip from the first location to the second location to ensure that the traveler will be able to board and travel on the passenger vehicle, wherein the estimated remaining duration is based at least in part upon an estimated transfer duration required for the traveler to travel from the first location to the second location and board and depart on the passenger vehicle, wherein the estimated transfer duration is based at least in part on real-time delay information associated with at least one mode of transportation to be used by the traveler to travel between the first location and the second location; and communicating a hurry status indication to the traveler based upon the estimated remaining duration to enable the traveler to assess when the traveler needs to commence the transfer segment of the trip from the first location to the second location.

2. The method of claim 1, wherein determining the estimated remaining duration includes determining an estimated travel duration associated with the traveler traveling from the first location to the second location, wherein the estimated remaining duration includes the estimated travel duration.

3. The method of claim 2, wherein determining the estimated travel duration includes determining the estimated travel duration based at least in part upon a mode of transportation used to travel at least a portion of a route between the first and second locations.

4. The method of claim 3, wherein the mode of transportation comprises a road vehicle, and wherein the real-time delay information includes traffic information associated with the portion of the route.

5. The method of claim 3, wherein the mode of transportation comprises a rail vehicle, and wherein the real-time delay information includes on delay information associated with the rail vehicle.

6. The method of claim 3, wherein the mode of transportation is selected from among a plurality of modes of transportation in response to user input received from the traveler.

7. The method of claim 1, wherein determining the estimated remaining duration includes determining a processing duration associated with the traveler boarding the passenger vehicle in sufficient time to depart on the passenger vehicle after arriving at the second location, wherein the estimated transfer duration includes the processing duration.

8. The method of claim 7, wherein determining the processing duration includes determining the processing duration based at least in part upon a check-in duration associated with checking in with a carrier for with the passenger vehicle.

9. The method of claim 7, wherein determining the processing duration includes determining the processing duration based at least in part upon a security check duration associated with passing through a security checkpoint prior to boarding the passenger vehicle.

10. The method of claim 7, wherein determining the processing duration includes determining the processing duration based at least in part upon a boarding duration associated with traveling to a departure gate and boarding the passenger vehicle.

11. The method of claim 7, wherein determining the processing duration includes determining the processing duration at least in part based upon a rule associated with a minimum duration for a prerequisite activity to occur prior to departure of the passenger vehicle.

12. The method of claim 11, wherein the prerequisite activity is a check-in with a carrier for with the passenger vehicle.

13. The method of claim 11, wherein the prerequisite activity is physically boarding the passenger vehicle.

14. The method of claim 11, wherein the rule is associated with the reservation for the traveler, the method comprising retrieving the rule from the reservation from a computer system upon which the reservation is stored.

15. The method of claim 11, wherein the rule is associated with a point of departure disposed at the second location.

16. The method of claim 7, wherein the passenger vehicle departs from a point of departure disposed at the second location, and wherein the processing duration is determined at least in part based upon historical data associated with the point of departure.

17. The method of claim 7, wherein the passenger vehicle departs from a point of departure disposed at the second location, and wherein the processing duration is determined at least in part based upon real time data associated with the point of departure.

18. The method of claim 1, wherein the estimated transfer duration is based at least in part upon a scheduled time of departure for the passenger vehicle specified by the reservation associated with the traveler.

19. The method of claim 1, wherein the estimated transfer duration is based at least in part upon a predicted time of departure for the passenger vehicle as a result of a delay.

20. The method of claim 1, further comprising determining the estimated transfer duration by a central service in communication with a mobile device for the traveler.

21. The method of claim 20, wherein determining the estimated remaining duration is performed by the central service, and wherein communicating the hurry status indication to the traveler includes communicating the hurry status indication from the central service to the mobile device.

22. The method of claim 20, wherein determining the estimated remaining duration is performed by the mobile device, and wherein communicating the hurry status indication to the traveler includes displaying the hurry status indication on the mobile device.

23. The method of claim 1, wherein communicating the hurry status indication to the traveler includes displaying the hurry status indication on a mobile device for the traveler.

24. The method of claim 1, wherein the first location is determined based upon mobile geolocation data collected for a mobile device for the traveler.

25. The method of claim 1, wherein the passenger vehicle is selected from the group consisting of an airplane, a train, a ferry, and a ship.

26. The method of claim 1, further comprising determining a missed departure if the estimated remaining duration is less than or equal to zero.

27. The method of claim 26, further comprising initiating modifying the reservation to reschedule the traveler on a later scheduled passenger vehicle in response to determining the missed departure.

28. The method of claim 1, further comprising determining the hurry status indication based upon the estimated remaining duration as a first status when the estimated remaining duration is greater than a warning buffer.

29. The method of claim 1, further comprising determining a recommended time to commence the transfer segment of the trip from the first location to the second location based upon the estimated transfer duration, the method further comprising determining a missed departure if a current time is after the recommended time.

30. The method of claim 1, wherein communicating the hurry status indication includes causing a mobile device for the traveler to display a remaining time counter based on the estimated remaining duration.

31. The method of claim 1, wherein communicating the hurry status indication includes causing a mobile device for the traveler to display the hurry status indication.

32. The method of claim 31, wherein causing the mobile device to display the hurry status indication includes causing the mobile device to display a first color in response to the estimated remaining duration exceeding a warning buffer, to display a second color in response to the estimated remaining duration being less than the warning buffer but greater than zero, and to display a third color in response to the estimated remaining duration being less than or equal to zero.

33. An apparatus, comprising:
at least one processor; and
program code configured to be executed by the at least one processor to monitor a status for a traveler disposed at a first location and desiring to travel on a passenger vehicle that is scheduled to depart from a second location at a scheduled time, the program code configured to access a reservation for the traveler to retrieve details for one or more travel segments of a trip for the traveler, the one or more travel segments including a first travel segment for travel on the passenger vehicle from the second location at the scheduled time, and to register the first travel segment for hurry status monitoring based upon the accessed reservation, the program code further configured to, after registration of the first travel segment for hurry status monitoring, communicate a hurry status indication to the traveler prior to the traveler commencing a transfer segment of a trip from the first location to the second location for departure on the passenger vehicle to enable the traveler to assess when the traveler needs to commence the transfer segment of the trip from the first location to the second location, wherein the hurry status indication is based upon an estimated remaining duration before the traveler should commence the transfer segment of the trip from the first location to the second location to ensure that the traveler will be able to board and travel on the passenger vehicle, wherein the estimated remaining duration is based at least in part upon an estimated transfer duration required for the traveler to travel from the first location to the second location and board and depart on the passenger vehicle, and wherein the estimated transfer duration is based at least in part on real-time delay information associated with at least one mode of transportation to be used by the traveler to travel between the first location and the second location.

34. The apparatus of claim 33, wherein the at least one processor is resident in a mobile device.

35. The apparatus of claim 34, wherein the program code is further configured to determine the estimated remaining duration.

36. The apparatus of claim 34, wherein the program code is further configured to receive the estimated remaining duration from a central service.

37. The apparatus of claim 33, wherein the at least one processor is resident in a server computer, and wherein the program code is configured to communicate the hurry status indication to the traveler by communicating the hurry status indication to a mobile device for the traveler.

38. A program product, comprising:
a non-transitory computer readable medium; and
program code stored on the computer readable medium and configured to be executed by at least one processor to monitor a status for a traveler disposed at a first location and desiring to travel on a passenger vehicle that is scheduled to depart from a second location at a scheduled time, the program code configured to access a reservation for the traveler to retrieve details for one or more travel segments of a trip for the traveler, the one or more travel segments including a first travel segment for travel on the passenger vehicle from the second location at the scheduled time, and to register the first travel segment for hurry status monitoring based upon the accessed reservation, the program code further configured to, after registration of the first travel segment for hurry status monitoring, communicate a hurry status indication to the traveler prior to the traveler commencing a transfer segment of a trip from the first location to the second location for departure on the passenger vehicle to enable the traveler to assess when the traveler needs to commence the transfer segment of the trip from the first location to the second location, wherein the hurry status indication is based upon an estimated remaining duration before the traveler should commence the transfer segment of the trip from the first location to the second location to ensure that the traveler will be able to board and travel on the passenger vehicle, wherein the estimated remaining duration is based at least in part upon an estimated transfer duration required for the traveler to travel from the first location to the second location and board and depart on the passenger vehicle, and wherein the estimated transfer duration is based at least in part on real-time delay information associated with at least one mode of transportation to be used by the traveler to travel between the first location and the second location.

* * * * *